US012761881B2

(12) United States Patent
Mordovtsev et al.

(10) Patent No.: US 12,761,881 B2
(45) Date of Patent: Oct. 13, 2026

(54) GENERATIVE ARTIFICIAL INTELLIGENCE (AI)-BASED REMEDIATION SCRIPT GENERATION AND CUSTOMIZATION

(71) Applicant: Acronis International GmbH, Schaffhausen (CH)

(72) Inventors: Dmitrii Mordovtsev, Sofia (BG); Chan Wah Ng, Singapore (SG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 300 days.

(21) Appl. No.: 18/613,988

(22) Filed: Mar. 22, 2024

(65) Prior Publication Data

US 2025/0298582 A1 Sep. 25, 2025

(51) Int. Cl.
*G06F 8/30* (2018.01)
*G06N 3/0475* (2023.01)

(52) U.S. Cl.
CPC ............. *G06F 8/31* (2013.01); *G06N 3/0475* (2023.01)

(58) Field of Classification Search
None
See application file for complete search history.

(56) References Cited

U.S. PATENT DOCUMENTS

| | | | | |
|---|---|---|---|---|
| 10,581,888 | B1 | 3/2020 | Agranonik et al. | |
| 11,379,442 | B2 | 7/2022 | Gandi et al. | |
| 12,056,006 | B1 * | 8/2024 | Bishop | G06F 11/0793 |
| 2017/0083400 | A1 * | 3/2017 | McEwen | G06F 11/079 |
| 2025/0077399 | A1 * | 3/2025 | Sen | G06F 11/328 |
| 2025/0291898 | A1 * | 9/2025 | Bu | G06N 7/01 |
| 2025/0291932 | A1 * | 9/2025 | Bu | G06F 21/577 |
| 2025/0291933 | A1 * | 9/2025 | Bu | H04L 63/1433 |

FOREIGN PATENT DOCUMENTS

EP 3447701 A1 2/2019

OTHER PUBLICATIONS

Acronis. The Role of AI and ML in Ransomware Protection, Jun. 27, 2023, https://www.acronis.com/en-us/blog/posts/role-of-ai-and-ml-in-ransomware-protection/, The Role of AI and ML in Ransomware Protection.pdf.

Acronis, What is Vulnerability Remediation?, Jun. 27, 2023, https://www.acronis.com/en-us/blog/posts/vulnerability-remediation/, What is Vulnerability Remediation .pdf.

* cited by examiner

*Primary Examiner* — Qing Chen
(74) *Attorney, Agent, or Firm* — ESPE Legal Consultancy FZ-LLC

(57) ABSTRACT

Systems and methods for generating and customizing remediation scripts. Generative artificial intelligence (AI) models can analyze existing scripts and tailor scripts according to specific incidents and environmental parameters, thereby creating a faster, more consistent, and error-free incident response process compared to existing solutions.

20 Claims, 4 Drawing Sheets

GENERATIVE ARTIFICIAL INTELLIGENCE (AI)-BASED REMEDIATION SCRIPT GENERATION AND CUSTOMIZATION

TECHNICAL FIELD

Embodiments relate to the field of incident management and cybersecurity. More particularly, embodiments relate generative artificial intelligence (AI) in incident management.

BACKGROUND

In the ever-evolving field of incident management and cybersecurity, ensuring timely and accurate remediation of incidents remains a paramount challenge. Traditional solutions require manual script creation, which can be time-consuming, inconsistent across incidents, and prone to human error. The rapid pace of technological advancements and the heterogeneous nature of computing environments make it increasingly difficult for incident response teams to craft suitable scripts for every possible situation.

In one example, traditional solutions generally use pre-defined remediation scripts collections stored in repositories or databases. These scripts are often crafted by expert system administrators and are based on known vulnerabilities, system configurations, or common incident types. However, they are static in nature, meaning they lack the capability to adapt to unique situations or variations in environments. Moreover, as new vulnerabilities or threats emerge, these databases need manual updates, making them less efficient and more resource-intensive over time.

Therefore, there is a need for systems and methods that provide efficient, context-specific, and error-free remediation scripts in real-time.

SUMMARY

Embodiments described or otherwise contemplated herein substantially meet the aforementioned needs of the industry. Embodiments described herein include systems and methods for generating customized remediation scripts using generative artificial intelligence. By employing a generative AI model that can analyze existing scripts and tailor new scripts according to specific incidents and environmental parameters, embodiments address the need for a faster, more consistent, and error-free incident response process. Embodiments are able to learn from existing scripts, adapt to different contexts, and generate tailored remediation scripts, thereby enhancing the overall resilience and efficiency of incident management within an organization.

In a feature and advantage of embodiments, utilization of generative AI can produce remediation scripts by automated generation, thereby reducing the need for manual script creation. In one example, remediation scripts can be generated in real-time without user involvement. A security monitoring system can identify a specific vulnerability. The security monitoring system can communicate a request including a description of the script purpose, or a system environment such as operating system type, an incident type, a username, or a vulnerability code (e.g. MITRE) or to a script generation service. The script generation service searches the vector database for existing remediation scripts, and if the script exists in the repository, it is tailored for the user environment.

In a feature and advantage of embodiments, tailored responses are generated based on specific incidents and environmental parameters, ensuring a more accurate response compared to the one-size-fits-all approach of existing solutions.

In a feature and advantage of embodiments, learnings from implementations of previously-generated scripts and their respective interactions in the system environment improve efficiency over time. For example, a script generated can be implemented and executed. The effectiveness of the script can be evaluated and used to improve future scripts, such as by marking the script for effectiveness, and subsequently revising the script or removing the script from the script database, as needed.

In a feature and advantage of embodiments, generative-AI-based script generation can be integrated into monitoring systems to ensure a proactive response and reducing incident resolution times.

In an embodiment, a system for remediating an incident on a computer system comprises a script database configured to store a plurality of incident response scripts; a script description generative artificial intelligence (AI) model configured to generate a plurality of descriptions of each of the plurality of incident response scripts; an embeddings generative AI model configured to generate a plurality of vectors for each of the plurality of descriptions; a vector store configured to sore the plurality of incident response scripts, the plurality of descriptions, and the plurality of vectors; a backend server including at least one processor operably coupled to memory, and instructions that, when executed by the at least one processor, cause the at least one processor to implement: a request handler engine configured to receive a request for a remediation script, the request including a description of a script purpose and generate a request vector from the script purpose, and a matching engine configured to perform a similarity search in the vector store based on the request vector and match a most suitable script from the plurality of incident response scripts based on a similarity measure; a tailoring generative AI model configured to tailor the most suitable script according to the script purpose to generate a tailored remediation script by modifying at least one line in the most suitable script for execution according to the script purpose, wherein the backend server further comprises a remediation engine configured to apply the tailored remediation script to the computer system to remediate the incident.

In an embodiment, a method of remediating an incident on a computer system, the method comprising: storing a plurality of incident response scripts in a script library; generating a plurality of descriptions of each of the plurality of incident response scripts using a generative artificial intelligence (AI) model service; generating a plurality of vectors for each of the plurality of descriptions using an embeddings generative AI model; storing the plurality of incident response scripts, the plurality of descriptions, and the plurality of vectors in a vector store; receiving a request for a remediation script, the request including a description of a script purpose; generating a request vector from the script purpose; performing a similarity search in the vector store based on the request vector and matching a most suitable script from the plurality of incident response scripts based on a similarity measure; tailoring the most suitable script using the generative AI model service according to the script purpose to generate a tailored remediation script by modifying at least one line in the most suitable script for execution according to the script purpose; and applying the tailored remediation script to the computer system to remediate the incident.

In an embodiment, a system for remediating an incident on a computer system comprises a plurality of cloud-based generative artificial intelligence (AI) models trained on a library of remediation scripts, the AI models including: a first model configured to generate a plurality of descriptions including a description for each of the remediation scripts, a second model configured to generate a plurality of embeddings for the plurality of descriptions including an embedding representation of each of the descriptions, and a third model configured to modify a remediation script based on a script request; a vector store configured to store associated remediation scripts, descriptions, and embeddings; a backend server including a processor and an operable coupled memory and configured to: perform a similarity search in the vector store based on the request and match a most suitable script using a cosine similarity comparison of angles between the plurality of embeddings and a request embedding of the request, execute the second model to generate the request embedding, execute the third model to modify the most suitable script to generate a tailored script, and provide the tailored script to the computer system for remediation of the incident.

BRIEF DESCRIPTION OF THE DRAWINGS

Subject matter hereof may be more completely understood in consideration of the following detailed description of various embodiments in connection with the accompanying figures, in which.

Figure 1:
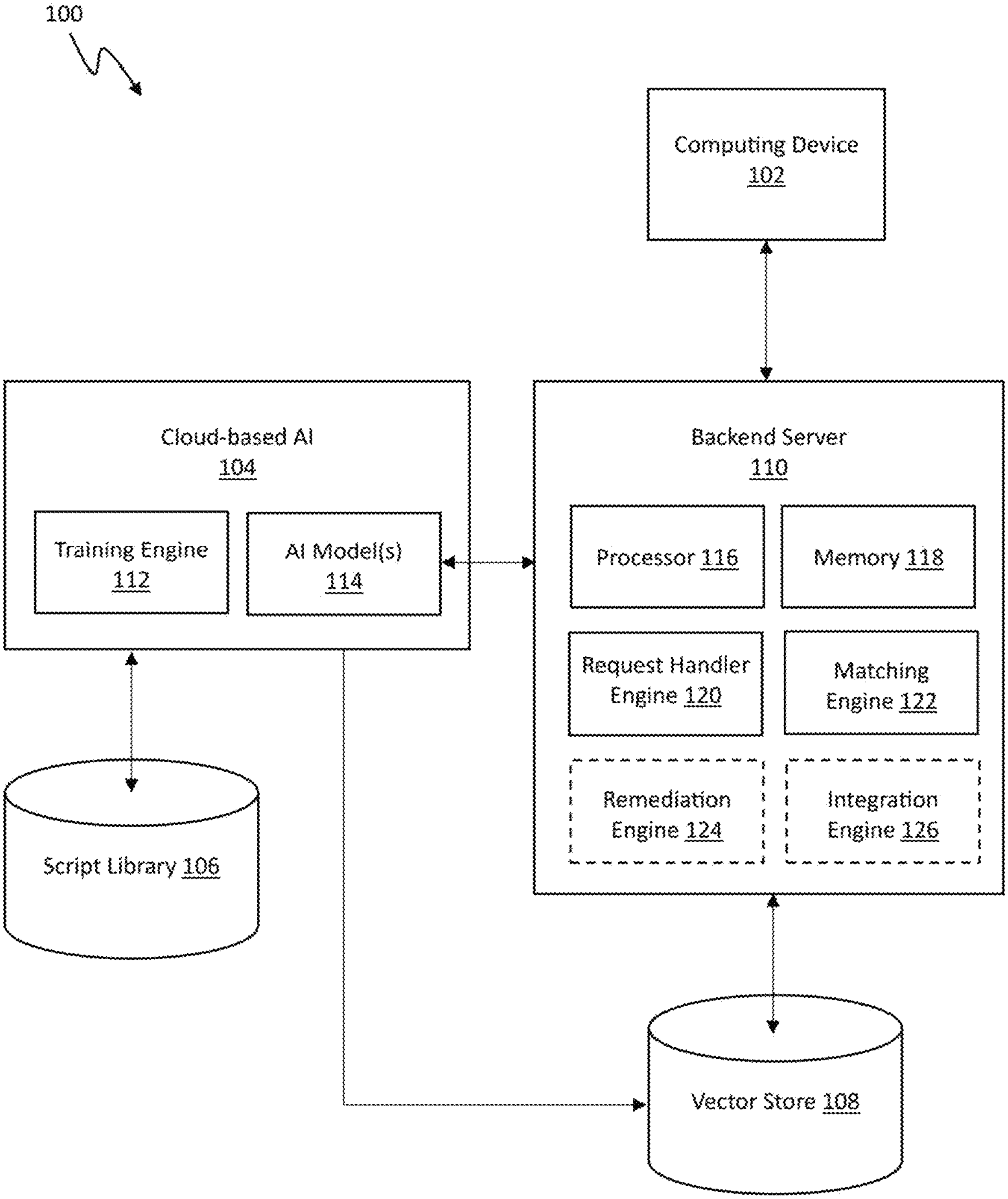
FIG. 1 is a block diagram of a system for generating customized remediation scripts, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Systems and methods for generating customized remediation scripts using generative artificial intelligence are described and contemplated herein. Referring to FIG. 1, a block diagram of a system 100 for generating customized remediation scripts is depicted, according to an embodiment. System 100 generally comprises a computing device 102, cloud-based AI 104, a script library 106, a vector store 108, and a backend server 110.

Embodiments described herein include various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Computing device 102 comprises an electronic device protected by system 100. In particular, system 100 can provide one or more remediation scripts to remediate a cybersecurity incident on computing device 102. In an example, computing device 102 can be desktop computer, a laptop computer, tablet, mobile computing device, server, workstation, or Internet-of-things (IoT) device, among other electronic devices. Though depicted as protecting a single computing device, system 100 can, in other embodiments, include a plurality of computing devices 102, such as a networked system of devices. In embodiments, computing device 102 can be utilized by a user to interact with other components of system 100, such as backend server 110 to obtain one or more remediation scripts.

As described, computing device 102 can be a system affected by a cybersecurity incident. In other embodiments, computing device 102 can be a system other than the affected system, such as by which a user can request a script for a different computing device 102 affected system.

Cloud-based AI 104 comprises a training engine 112 and one or more AI models 114. In an embodiment, as illustrated in FIG. 1, cloud-based AI 104 is a cloud-based service such that training engine 112 and one or more AI models 114 can be distributed across a network of multiple computing devices, each device having its own processor and memory for executing training engine 112 and associated AI models 114. In another embodiment, cloud-based AI 104 can be implemented on a single device having its own processor and memory.

Training engine 112 is configured to train or retrain the one or more AI models 114. In an embodiment, training engine 112 is configured to train AI models 114 using existing remediation script data. In one example, training engine 112 can train AI models 114 using data from script library 106.

In some aspects, training engine 112 is configured to utilize a comprehensive dataset including scripting documentation, shell scripts and descriptions or comments for each script. For example, scripting documentation can include function name, description, and function content:

Function Name: Invoke-RemoteCommand

Description: Executes a command on a remote machine using PSRemoting.

Function Content:

```
function Invoke-RemoteCommand {
  param (
    [string]$ComputerName,
    [string]$Command
  )
  Invoke-Command -ComputerName $ComputerName -ScriptBlock
{ Invoke- Expression -Command $Command }
 }
```

In another example, the dataset can include annotate code snippets:

```
# Retrieves disk space usage for all drives
Get-PSDrive -PSProvider FileSystem | Select-Object Name,
@{Name="Used
(GB)";Expression={"{0:N1}" -f (($_.Used / 1GB))}},
@{Name="Free
(GB)";Expression={"{0:N1}" -f (($_.Free / 1GB))}},
@{Name="Total
(GB)";Expression={"{0:N1}" -f (($_.Used + $_.Free) / 1GB)}}
```

Further, training data can include scripts for system administration tasks (user management, disk cleanup, system monitoring), scripts for network management (firewall configuration, port scanning, network diagnostics), or scripts for security purposes (log analysis, malware removal, encryption tasks). Each script can be annotated with metadata or comments that explain its purpose, parameters, and expected outcomes. This helps the models learn not just the scripting syntax but also the semantic purpose behind different scripts.

In an embodiment, each of AI models 114 can be trained on the same data. In an embodiment, AI models 114 comprises an LLM model and an embeddings model, which are bonded and trained on the same data. In this example, the trained LLM model can be utilized for different use cases, such as script description in one case, and script generation or tailoring in another case.

Script library 106 comprises one or more storage repositories, such as a database, logical disk space, file, or other suitable storage medium configured to store remediation scripts. In an embodiment of a database, script library 106 can be a general-purpose database management storage system (DBMS) or relational DBMS as implemented by, for example, ORACLE, IBM DB2, Microsoft SQL Server, PostgreSQL, MySQL, SQLite, LINUX, or UNIX solutions. In an embodiment of a database, script library 106 can be a document database.

In an embodiment, a particular managed service provider (MSP) implementing system 100 has access to script library 106. In embodiments, cloud-based AI 104 is provided access to all scripts in script library 106. In another embodiment, cloud-based AI 104 is provided access to a selected subset of the scripts in script library 106 (for example, only scripts applicable to a given environment, as desired). In examples where all of script library 106 is accessible, training engine 112 can train AI models 114 based on selectively paring down training data.

One or more AI models 114 comprises a generative AI model trained to create new data. For example, AI models 114 can be a software-as-a-service (SaaS) large language model (LLM). In another example, AI models 114 can be a local model (e.g. not cloud-based) and pretrained on a script code base.

In a first model, AI models 114 includes a script description generative AI model configured to generate a description for a given incident response script. For example, upon input of a script, a text-based description of the script can be output by the script description generative AI model. Script description generative AI model can utilize various techniques within the AI model to analyze existing scripts and generate a script description.

In one aspect, a script description generative AI model can generate summaries of text using Natural Language Understanding (NLU). In particular, the model first needs to understand the content it is summarizing. This involves parsing the text to grasp the thematic elements, context, and nuances. In another aspect, a script description generative AI model using one or more attention mechanisms. In particular, such attention mechanisms allow the model to focus on different parts of the input text when generating each part of the summary. This is crucial for producing coherent and relevant summaries, especially when dealing with long documents.

In an embodiment, all of the scripts in script library 106 are input to script description generative AI model for generation of corresponding descriptions. In another embodiment, a selective subset of scripts in script library 106 are input to script description generative AI model for generation of corresponding descriptions. For example, training engine 112 can apply one or more filters to the scripts in script library 106 and use only the resulting scripts for training. A filter can include by label, such as approval by a certain user (e.g. security analyst), or by resolution, such as filtering out scripts that are outdated (e.g. in the situation when a software update fixed the problem, and the script is not needed anymore). Script library 106 can include such fields like "Approved" and "Outdated" which can be used for filtering the query results.

In an example, a script description generative AI model can be queried to explain what a script is doing. Script 1, which can be provided to the script description generative AI model with an associated query is provided by way of example below:

Script 1

```
# Check for and install the PSWindowsUpdate module if it's not already
installed
$module = Get-Module -ListAvailable -Name PSWindowsUpdate
if (-not $module) {
Install-Module -Name PSWindowsUpdate -Force -Confirm:$false
}
Import-Module PSWindowsUpdate
# Inform the user about virus activity
Add-Type -AssemblyName PresentationFramework
[System.Windows.MessageBox]::Show('Please be aware of recent virus
activities. Your system will now check for updates, install them, and
```

-continued

Script 1

```
reboot.', 'Virus Activity Alert', 'OK', 'Warning')
# Check for updates
Get-WindowsUpdate
# Install all available updates
Install-WindowsUpdate -MicrosoftUpdate -AcceptAll -AutoReboot
# The system will automatically reboot if updates are installed due to
the -AutoReboot switch.
# If you need a more controlled reboot or want to ensure it happens (in
cases where no updates are installed), you might add:
# Restart-Computer
```

The script description generative AI model can accordingly analyze the script and generate the example description, such as Description 1 below:

This PowerShell script automates the process of updating a Windows system by first ensuring the PSWindowsUpdate module is installed, then it alerts the user about virus activity with a pop-up message. It checks for and installs all available Windows updates, including those for Microsoft products, and reboots the system automatically if necessary to complete the update process.

Description 1

In a second model, AI models 114 includes an embeddings generative AI model configured to generate a vector for a given text-based description. For example, upon input of a text-based description of the script, a vector can be output by the embeddings generative AI model. In embodiments, the embeddings generative AI model can utilize tokenization to split the text-based description of a script into tokens.

The following example is provided by way of illustration. Consider the input text: "This PowerShell script automates". In the process of converting this text into embeddings, for illustration only, a simplified model is assumed that transforms each word into a 4-dimensional vector. In embodiments described and contemplated herein, actual models can utilize 768 dimensions or more.

First, tokenization is used to split the text into tokens (words, in this simplified example). Adding special tokens for model processing purposes results in tokens: [CLS], This, PowerShell, script, automates, [SEP].

Second, vectorization (e.g. embedding) is used to transform each token into a 4-dimensional vector based on its meaning and context. For illustration here, arbitrary vectors are assigned:

[CLS]: (0.01, 0.02, 0.03, 0.04)

This: (0.1, 0.2, 0.3, 0.4)

PowerShell: (0.5, 0.6, 0.7, 0.8)

script: (0.9, 1.0, 1.1, 1.2)

automates: (1.3, 1.4, 1.5, 1.6)

[SEP]: (0.05, 0.06, 0.07, 0.08)

Third, the resulting embedding matrix output is a matrix where each row corresponds to the embedding of a token in Table 1:

TABLE 1

| [CLS] | This | Powershell | script | automates | [SEP] |
|---|---|---|---|---|---|
| (0.01, 0.02, 0.03, 0.04) | (0.1, 0.2, 0.3, 0.4) | (0.5, 0.6, 0.7, 0.8) | (0.9, 1.0, 1.1, 1.2) | (1.3, 1.4, 1.5, 1.6) | (0.05, 0.06, 0.07, 0.08) |

The matrix of Table 1 captures the contextual semantic information of each word in the input text, transformed into a format that machine learning models can process for tasks such as classification, sentiment analysis, or other natural language understanding tasks.

In a third model, AI models 114 includes a script generation generative AI model configured to generate a script. For example, upon input of parameters for a desired script, the script generation generative AI model can generate a remediation script.

In an example, a user query can be:

Block the C:\Path\ExampleMalware.exe app to be able to use port 12345.

Script language: PowerShell

OS: Windows 10

Admin privileges: no

The resulting script is presented in Script 2 below:

Script 2

```
# Check if the script is running with administrative privileges
If(-NOT
([Security.Principal.WindowsPrincipal][Security.Principal.WindowsIdentity]::GetCurrent
( )).IsInRole([Security.Principal.WindowsBuiltInRole] "Administrator"))
{
   Write-Host "This script requires administrative privileges. Please run it as an
administrator."
   exit
}
# Define the application and port you want to block
$appPath = "C:\Path\ExampleMalware.exe"
$port = 12345
# Create a new firewall rule to block outbound traffic for the application on the specified
port
$ruleName = "Block_" + (Get-Item $appPath).Name + "_Port" + $port
$ruleDescription = "Block outbound traffic from " + $appPath + " on port " + $port
# Check if the firewall rule already exists
If (!(Get-NetFirewallRule -Name $ruleName -ErrorAction SilentlyContinue))
{
   New-NetFirewallRule -DisplayName $ruleName -Description $ruleDescription -
Direction Outbound -Program $appPath -Action Block -LocalPort $port -Protocol TCP
   Write-Host "Firewall rule created to block $appPath on port $port."
}
```

-continued

| Script 2 |
|---|

```
Else
{
  Write-Host “A firewall rule to block $appPath on port $port already exists.”
}
```

In another example, script generation generative AI model is configured to tailor a script. For example, an existing script (e.g. from vector store 108) can be modified according to the request (e.g. user or environmental or computing device 102 parameters). More particularly, based on information from the user environment (such as a request for a script, as will be described), script generation generative AI model can modify the script for the script purpose. In other examples, script generation generative AI model can modify the script for the specific OS, scripting language, user privileges, incident type, incident details, vulnerability code, user profile, control level, decision-making pattern, organizational context, or other suitable user, device, system or incident parameters. In an example, without such tailoring, the script may not execute on the computing device at issue. In another example, without such tailoring, the script may not execute efficiently, such that with such tailoring, the script is optimized for the user, computing device, system, structure, or incident at issue.

Example incident types can include:

“Malware Infection”: scripts tailored to detect, quarantine, or remove malware based on signatures or behavior analysis. Such scripts can also restore affected files from backups.

Ransomware Attack”: scripts that isolate infected machines, identify ransomware strains (if possible), and apply specific countermeasures. Such scripts can also automate communications with users about the incident.

“Unauthorized Access”: scripts designed to detect and respond to breaches, such as by locking down accounts, changing passwords, and auditing logs for suspicious activities.

“Phishing Detection”: scripts that scan email inboxes for phishing indicators, move suspected phishing emails to a quarantine area, and notify users and administrators.

In another example, a request includes an objective measure for the script, and can include:

Performance: Optimize for minimal impact on system resources; for example, minimizing CPU and memory usage or ensuring that network-intensive scripts do not saturate available bandwidth.

Resilience: Make scripts fault-tolerant so they can handle unexpected conditions without failing. This includes error handling and recovery procedures.

User Impact: Minimize disruption to users. Scripts, especially those dealing with incident response, should operate transparently when possible and communicate clearly and effectively when user action is needed.

Security: Ensure scripts themselves do not introduce security vulnerabilities. This includes secure handling of credentials, encryption of sensitive data, and following the principle of least privilege.

Automation and Manual Override: Ensure there is capability for manual override or intervention when the situation requires nuanced judgment.

In an example of script tailoring, a generic script outlines the steps necessary for the remediation action without any specific details about the environment. Accordingly, placeholders or comments where customization is needed are utilized in the generic script. In the example below, the script aims to ensure that the firewall rule to block inbound connections on port 12345 is explicitly associated with mitigating “ExampleMalware.” An example generic script is presented below in Script 3.

| Script 3 |
|---|

```
# PowerShell Script Template for Remediation Actions
# Placeholder for determining the operating system type, user privileges,
and username
# This section will need to be tailored based on the environment specifics
# Define the remediation action - In this case, closing a specific port on
the firewall function Close-FirewallPort {
  param (
    [Parameter(Mandatory=$true)]
    [int]$Port
  )
  # Placeholder for the command to close the port, to be tailored based
on OS and privileges
}
# Placeholder for executing the remediation action with error handling
# This needs to be tailored to check for administrative privileges and
handle errors accordingly
Close-Port -PortNumber 12345
```

In the previous example, the generic script is tailored to fit specific environment parameters, such as the provided inputs OS type, username, and privileges. For illustration, consider the following environment specifics: OS Type: Windows 10; Username: UserExample; Privileges: Non-administrative (standard user).

Based on these inputs, the generic script is tailored to be run in a Windows-10 environment where the user may not initially have administrative privileges. The tailored script includes a direct action (closing a port) and handles conditional logic based on the user’s privilege level as follows in Script 4.

| Script 4 |
|---|

```
# Define the Close-Port function to close a specific port on the firewall
Function Close-Port {
  param (
    [Parameter(Mandatory=$true)]
    [int]$PortNumber
```

-continued

Script 4

```
)
  Write-Host "Attempting to close port $PortNumber..."
  # tailored command specific for Windows-10
  netsh advfirewall firewall add rule name="BlockPort$PortNumber" dir=in action=block
protocol=TCP localport=$PortNumber
}
$isAdmin                                                                             =
([Security.Principal.WindowsPrincipal][Security.Principal.WindowsIdentity]::GetCurrent
( )).IsInRole([Security.Principal.WindowsBuiltInRole]::Administrator)
# Commands checking for admin privileges tailored for non-admin users
if (-not $isAdmin) {
  Write-Host "User does not have administrative privileges. Elevation is required to
perform this action."
  # Here, you would include instructions or a mechanism for elevation.
  # For example, instructing the user to restart the script as an administrator
  Write-Host "Please restart this script with administrative privileges to close the port."
} else {
  # If the script is running with administrative privileges, proceed to close the port directly
  Close-Port -PortNumber 12345
}
```

As illustrated above, script tailoring is implemented for the request. In one aspect, the request is used to modify one or more lines in the script or its general architecture. In one aspect, the script can be modified according to the script purpose (e.g. a remediation purpose will have different calls than a monitoring purpose). In another aspect, the script can be modified according to environmental parameters for the particular environment at issue (e.g. Windows commands can be different than Unix commands). In another aspect, the script can be modified according to a vulnerability code. Different MITRE identifiers can invoke different script calls, tailored to the unique identifier. In another aspect, the script can be modified according to a user profile (e.g. an administrator profile may have access to certain components of the computing device than a standard user). Certain files, folders, or registry settings accessible by a given user can be used in the tailoring. In another aspect, a computing device control level is used. For example, script commands can be implemented according to the control level ability (e.g. system commands at the machine level are different than at the user level). In another aspect, a user control level is used (e.g. administrator users have different access than standard users. In another aspect, a user decision-making pattern is used. For example, if a decision-making pattern is indicated as mitigation, the script can be modified for mitigation. If a decision-making pattern is indicated as monitoring, the script can be modified to be a monitoring-focused script. In another example, if a user decision-making pattern corresponding to previous scripts associated with a user is to "stop all activity", the instant script can be similarly tailored to stop all activity. In another example, if a user decision-making pattern corresponding to previous scripts associated with a user is to "continue all activity, but notify me", the instant script can be similarly tailored to continue all activity and notify the user. In another aspect, an organizational context is used. For example, the script can be modified to traverse the server structure according to a server architecture diagram passed with the request. In another example, the script can be modified to traverse systems associated with business or user context in the business's organizational hierarchy chart (e.g. a Marketing Department server can be identified based on its business relationship to a Sales Department).

Vector store 108 comprises one or more storage repositories, such as a database, logical disk space, file, or other suitable storage medium configured to store data output by AI models 114. For example, vector store 108 can comprise a database (such as those described with respect to script library 106). In an embodiment, vector store 108 is configured to store remediation scripts. In an embodiment, vector store 108 is configured to descriptions associated with given remediation scripts. In an embodiment, vector store 108 is configured to store vectors associated with given descriptions of remediation scripts. In an embodiment, a data structure of an associated script, description, and embedding for a given script can be stored in the vector store according to a common key, tuple, or other linked data structure.

Vector store 108 is configured to efficiently store word embeddings and allow queries for word embeddings. In an embodiment, vector store 108 can be indexed such that in coordination with search algorithms (e.g. cosine similarity), allow for rapid, semantically driven searches. As described, word embeddings convert words into vectors that reflect their meanings, closely aligning semantically similar words in vector space. For instance, "king" and "queen" would have closely related vectors due to their related meanings, despite being distinct words.

A query in vector store 108 for "monarch" in such a database might return vectors for "king," "queen," and "royalty," thereby including identification of semantic connections. For example, "king" is represented by a vector like [0.5,−0.1,0.9], "queen" [0.48,−0.05,0.92]. "Monarch" can have a vector such as [0.49,−0.08,0.91], symbolizing its semantic relationship to royalty and governance, situated between "king" and "queen" in the vector space.

Backend server 110 generally comprises a processor 116, an operably coupled memory 118, a request handler engine 120, a matching engine 122, a remediation engine 124, and an integration engine 126.

Request handler engine 120 is configured to receive a request for a remediation script. In an embodiment, a request comprises input describing a purpose for the script (e.g. script purpose), such as a natural-language phrase, sentence, or other text-based description.

In an embodiment, a request optionally comprises one or more environmental parameters, such as the operating system, user privileges, incident type, or one or more details about an incident.

In an embodiment, a request optionally comprises a vulnerability code (e.g. MITRE).

In an embodiment, a request optionally comprises a user profile, such as a profile of the requesting user on computing device 102 (or other device on which the returned script will be executed). In one aspect, a user profile comprises a collection of folders, files, and registry and configuration settings that define the environment for a user who logs on to computing device 102 with a user account. In another example, a profile can be that of an administrator user if, for example, the requesting user is not an administrator but is requesting on behalf of a different administrator user who will execute the script.

In an embodiment, a request optionally comprises a control level. For example, the request can include a level corresponding to user, high level language, assembly language, system software, machine, control, or digital logic, for which the script or portions of the script is allowed to operate. In an embodiment, a control level can be associated with user privileges on computing device 102.

In an embodiment, a request optionally comprises a user decision-making pattern. For example, if the associated user has requested monitoring for a previous x number of requests, the pattern can indicate a monitoring preference. In another example, if the associated user has requested mitigation for a previous x number of requests, the pattern can indicate a mitigation preference. In an embodiment, the pattern can be associated with a system criticality, such that systems with a certain higher criticality can be associated with a first pattern and systems with a certain lower criticality can be associated with a second pattern. In an embodiment, the pattern can be generated by or at computing device 102, including by the user. In another embodiment, the pattern is not transmitted by the user at computing device 102 but is instead added to the request by, for example, the receiving request handler engine 120, which can determine a pattern based on an association with historical requests from the user and the resulting scripts provided in response to these scripts. For example, request handler engine 120 can utilize AI models 114 to determine a pattern.

In an embodiment, a request optionally comprises an organizational context. For example, a request can comprise data related to the structure of the organization in which computing device 102 is deployed. In one aspect, organizational context can include a server architecture diagram on which computing device 102 relies. In another aspect, organizational context can include business-focused structure, such as the business's organizational hierarchy chart, which can include business entities and user/positional entities.

In an embodiment, a user can provide a request to request handler engine 120 using computing device 102. In an embodiment, components of computing device 102 (such as an integrated monitoring system) can provide a request to request handler engine 120. In another embodiment, request handler engine 120 itself can actively gather request details from computing device 102.

Request handler engine 120 is further configured to utilize AI models 114 to synthesize the request to create a structure suitable to find a given script, such as a request vector. The request can be converted to a request vector to be used by matching engine 122 in searching vector store 108.

For example, to handle a user request such as, "monitor system performance and notify via email if certain thresholds are exceeded" (as an example script purpose) the following processing is done. First, preprocessing simplifies and standardizes the user request to improve search effectiveness. Preprocessing can include:

Lowercasing: Convert all text to lowercase to ensure consistency.

Removing stopwords: Eliminate common words (e.g., "and", "the") that don't add significant value to the search.

Lemmatization: Reduce words to their base or dictionary form (e.g., "monitoring" to "monitor").

The resulting request after preprocessing can be: "monitor system performance notify email thresholds exceeded".

Next, text summarization can be utilized, wherein a LLM model can compress the request into a more compact form, focusing on key elements: "monitor performance, email alerts for thresholds."

Next, vectorization can be utilized to convert the preprocessed text into a numerical vector. The embeddings model generates a high-dimensional vector that represents the semantic meaning of the request in a numerical form, for example, as a request vector.

Finally, the request vector can be used in a similarity search.

Matching engine 122 is configured to receive details about the request for a remediation script as passed by request handler engine 120 (such as a request vector) and search for a suitable script in vector store 108. In an embodiment, matching engine 122 is configured to perform a similarity search between the request and the stored script description and match a most suitable script description based on the specific incident and environmental factors. In an embodiment, a similarity search can implement a cosine similarity algorithm that compares the angle between two vectors (such as the request vector and the vectors associated with remediation scripts in the vector store), measuring how similar their directions are, regardless of the respective magnitudes of the vectors. In other embodiments, other algorithms such as Euclidean Distance, Approximate Nearest Neighbor, etc. can be used to find the most suitable script. In an embodiment, a "most suitable" reflects a maximum similarity value according to the similarity search results. In some embodiments, a single matching script is utilized. In other embodiments, multiple matching scripts can be utilized, such as to provide a cascading application of scripts, or to provide a user script options.

Remediation engine 124 is configured to provide a tailored script to computing device 102. For example, remediation engine 124 can communicate a script generated by or tailored by AI model 114 to a user of computing device 102. In such embodiments, the user (or automatically by computing device 102) can apply the script to the affected system (e.g. computing device 102). In an embodiment, remediation engine 124 is itself configured to apply the script. For example, a script generated by or tailored by AI model 114 can be executed on or in coordination with computing device 102.

In an embodiment, remediation engine 124 can monitor the success of the remediation and log the details to improve system 100 effectiveness. In an embodiment, a script can be marked in vector store 108 or script library 106 such that these statistics can be later gathered for monitoring and updating purposes. If a given script is not helpful (and marked as such), it can be modified or removed in script library 106.

In an example, updating can include implementing system updates for future applications. In particular, training engine 112 can implement a feedback loop where the outcomes of script applications (successful, partially successful, unsuccessful) are used to refine and improve script effectiveness. For instance, if a script is frequently successful in certain conditions but not in others, the system can learn to associate the script's applicability with specific environmental factors.

In another example, reinforcement learning can be used to implement a reinforcement learning model where the system learns the best course of action (e.g. the most effective remediation script) based on rewards received for successful remediation. Over time, the model can optimize script selection for various scenarios, effectively learning from past actions.

In another example, collaborative filtering for script recommendation can be utilized. Embodiments can use collaborative filtering to recommend scripts that have been successful in similar environments or scenarios, even if the exact request vector hasn't been encountered before.

Integration engine 126 is configured to integrate system 100 with existing monitoring systems to automatically trigger the process when an anomaly or incident is detected. For example, integration engine 126 can provide APIs to computing devices or systems under protection to the various components of system 100.

Generally, in operation of system 100, cloud-based AI 104 is used to populate vector store 108. In particular, training engine 112 can train AI models 114 based on remediation script data to populate vector store 108. Computing device 102 is used to specify a given remediation goal that will be analyzed and provided as a remediation script. In an embodiment, a user can utilize computing device 102 to enter certain remediation, environmental, user, system, or other parameters to request handler engine 120. In another embodiment, request handler engine 120 can ping computing device 102 for such parameters. Matching engine 122 searches vector store 108 for a most suitable script. The most suitable script can be tailored by one of AI models 114 and accordingly provided to computing device 102, or in an embodiment, implemented by remediation engine 124. Optionally, integration engine 126 can integrate system 100 components, such as cloud-based AI 104 and backend server 110 into an existing incident monitoring system on or in coordination with computing device 102 to automatically trigger incident remediation by tailored script generation when an incident or anomaly is detected, such as on computing device 102.

Figure 2:
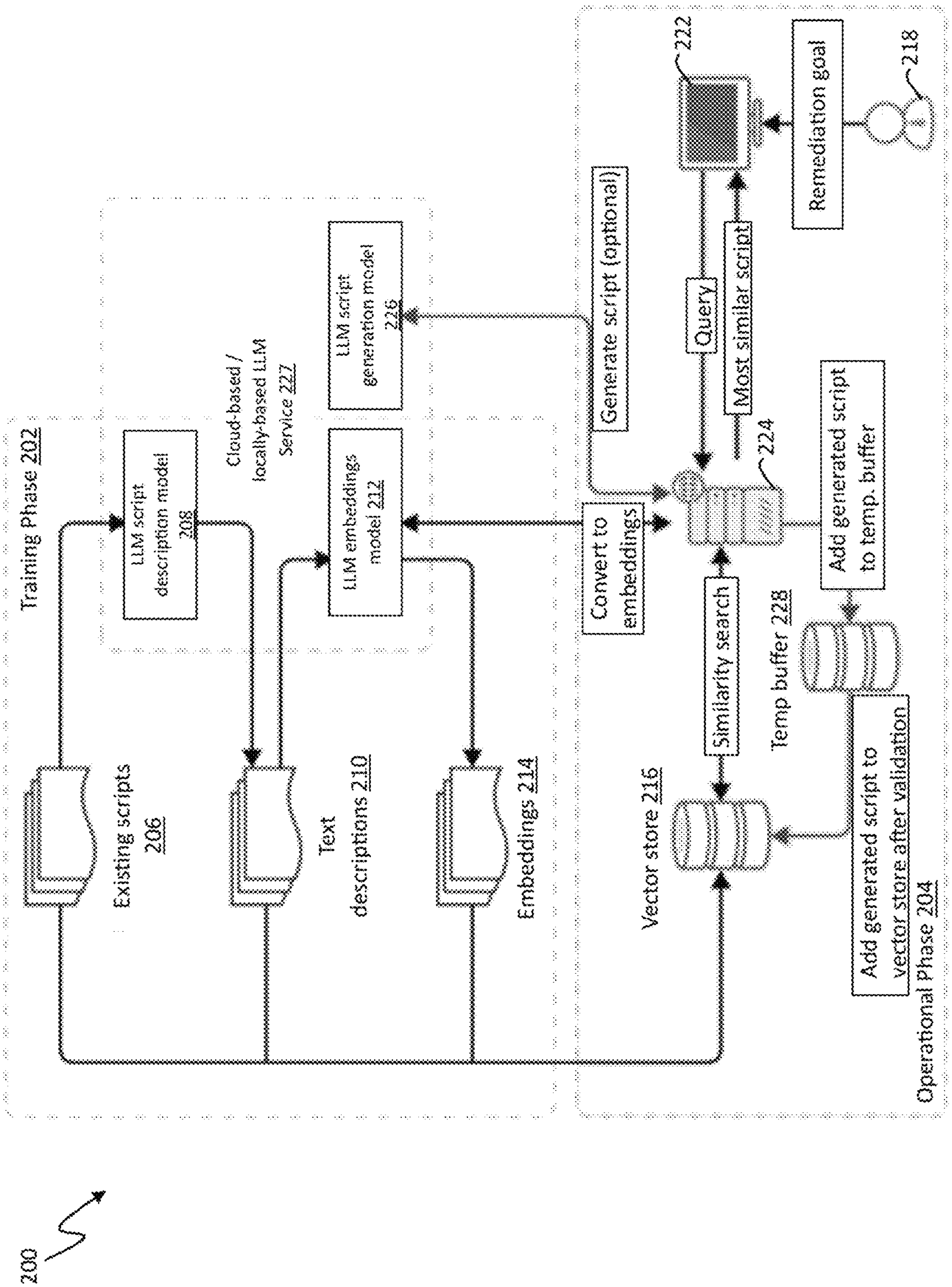
FIG. 2 is a block diagram of a system for generating customized remediation scripts, according to an embodiment.

Referring to FIG. 2, a block diagram of a system 200 for generating customized remediation scripts is depicted, according to an embodiment. In an embodiment, system 200 has many of the same components as system 100, but which are renumbered in FIG. 2 for ease of discussion. System 200 is described with respect to the flow of a training phase 202 and an operational phase 204.

Training phase 202 generally comprises using generative AI on a repository of existing scripts to populate a vector database (a storage containing text splits and their vector representations generated by an embeddings component). Operational phase 204 generally comprises utilizing a backend server to process requests from a user (or frontend component if presented) and provide a tailored script using data in the vector database, including optionally a script generation or tailoring component.

Referring first to training phase 202, a scripts library 206 of existing scripts (e.g. SQL or document database with scripts library) are input to an LLM script description model 208. In an embodiment, LLM script description model 208, and as will also be described, LLM embeddings model 212 (which provides vector representations), and LLM script generation model 226 (which generates or tailors scripts) can be implemented on a cloud-based or local-based LLM service 227, representing cloud-based or local-based generative models, accordingly.

LLM script description model 208 generates a text description 210 for one or more of the existing scripts in scripts library 206. Text description 210 is input to LLM embeddings model 212 to generate a vector representation (e.g. embedding 214) of text description 212.

In an embodiment, an existing script 206 can be stored in vector store 216. Likewise, a text description 210 can be stored in vector store 216. Additionally, an embedding 214 can be stored in vector store 216. In one embodiment, existing script 206, the corresponding text description 210, and the corresponding embedding 214 are stored in proximate time to each other in vector store 216, such as after embedding 214 is generated. In another embodiment, existing script 206 is stored in vector store 216 after its access by LLM script description model 208. Similarly, text description 210 associated with an existing script 206 can be stored in vector store 216 after generation by LLM script description model 208. Text description 210 can be associated with its corresponding script upon storage in vector store 216. Likewise, embedding 214 can be stored in vector store 216 after generation by LLM embeddings model 212. Embedding 214 can be associated with its corresponding script and description upon storage in vector store 216.

Referring next to operational phase 204, a user 218 can communicate a remediation goal using a computing device 222. In an embodiment, computing device 222 is not an affected system, but rather an interface to backend server 224. Computing device 222 queries backend server 224 for a remediation script (or otherwise communicates a request for query that is generated by backend server 224) based on the remediation goal. In an embodiment, one or more parameters such as an incident type and an affected system parameter are included in the remediation goal.

In an embodiment, LLM embeddings model 212 is utilized to convert the request into one or more embeddings for comparison with the vector store 216 data. In an embodiment, embeddings are stored on the backend server because embeddings are tightly coupled with a given LLM model and are a resource demanding component to generate. Using embeddings to conduct the similarity search improves efficiencies in search as well as in conserving backend resources (compared to generation on the backend).

A similarity search is then performed by backend server 224 of vector store 216 for a matching remediation script. In an embodiment, a most similar matching script can be returned to the backend server 224 and then to computing device 222. In another embodiment, the most similar matching script can be input to LLM script generation model 226 to modify the selected script. The most similar matching script can be tailored according to one or more parameters communicated as part of the script purpose. For example, LLM script generation model 226 can generate a new script based on the matched script and one or more parameters. In another example, LLM script generation model 226 can modify the matched script based on the one or more parameters. In another embodiment, in which a most similar matching script cannot be returned (such as no matching threshold reached by the similarity search), a new script can be generated by LLM script generation model 226 based on the one or more parameters.

In an embodiment, components including computing device 222, backend server 224, LLM script generation model 226, LLM embeddings model 212, and vector store 216 comprise a script generation service.

In an embodiment, as illustrated, components LLM script description model 208, LLM embeddings model 212, and LLM script generation model 226 can comprise a cloud-based or locally-based LLM service 227. Moreover, LLM script description model 208, LLM embeddings model 212, and LLM script generation model 226 can respectively be combined into fewer models, such as a combined LLM script description model 208-LLM script generation model 226 and a separate LLM embeddings model 212.

From the backend server 224, once the tailored script is generated by LLM script generation model 226, the tailored script is added to a temporary buffer 228. The tailored script can be validated while in temporary buffer 228. For example, the tailored script can optionally be validated by a cybersecurity analyst. In another example, the tailored script can optionally be validated by running in a sandbox environment (e.g. separate virtual machine) to check for syntax, execution time and for malicious or unintended actions.

The tailored script can then be added to vector store 216 after validation.

Figure 3:
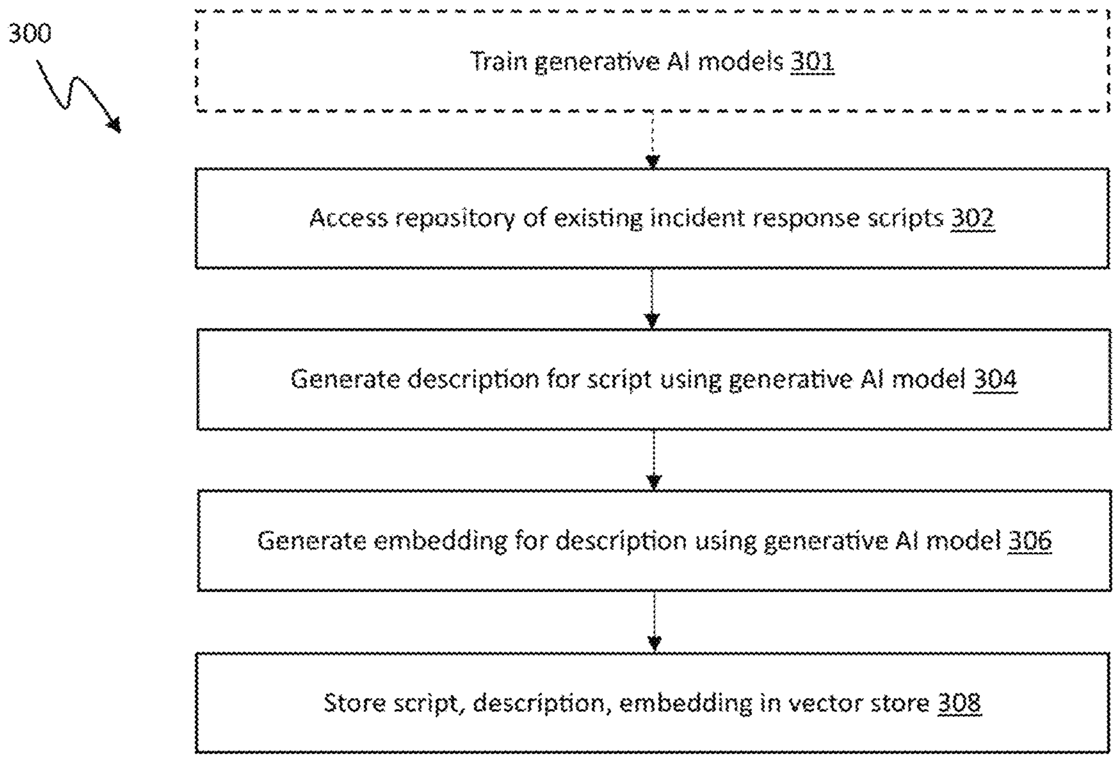
FIG. 3 is a flowchart of a method of training a system for customized remediation script generation, according to an embodiment.

Referring to FIG. 3, a flowchart of a method 300 of training a system for customized remediation script generation is depicted, according to an embodiment. In an embodiment, method 300 can be implemented by system 100 and/or 200 as depicted in FIGS. 1-2. Reference will be made to system 100 for ease of discussion.

At 301, method 300 optionally comprises training one or more generative AI models. For example, training engine 112 can train generative AI models 114 using existing remediation script data. In an embodiment, training engine 112 can train a script description generative AI model, an embeddings generative AI model, and a script generation generative AI model. In another embodiment, generative AI models 114 are pretrained such that training engine 112 does not need to be executed as part of method 300.

At 302, method 300 comprises accessing a repository of existing incident response scripts. For example, remediation scripts stored in script library 106 can be used in a query of script description generative AI model.

At 304, method 300 further comprises generating a description for each script using a generative AI model. For example, the script description generative AI model can generate a description of the script. In an embodiment, a respective description is generated for all of the scripts in the repository. In another embodiment, a respective description is generated for a subset of the scripts in the repository.

At 306, method 300 further comprises generating an embedding for a given description using a generative AI model. For example, the embeddings generative AI model can generate a vector for a given description.

Figure 4:
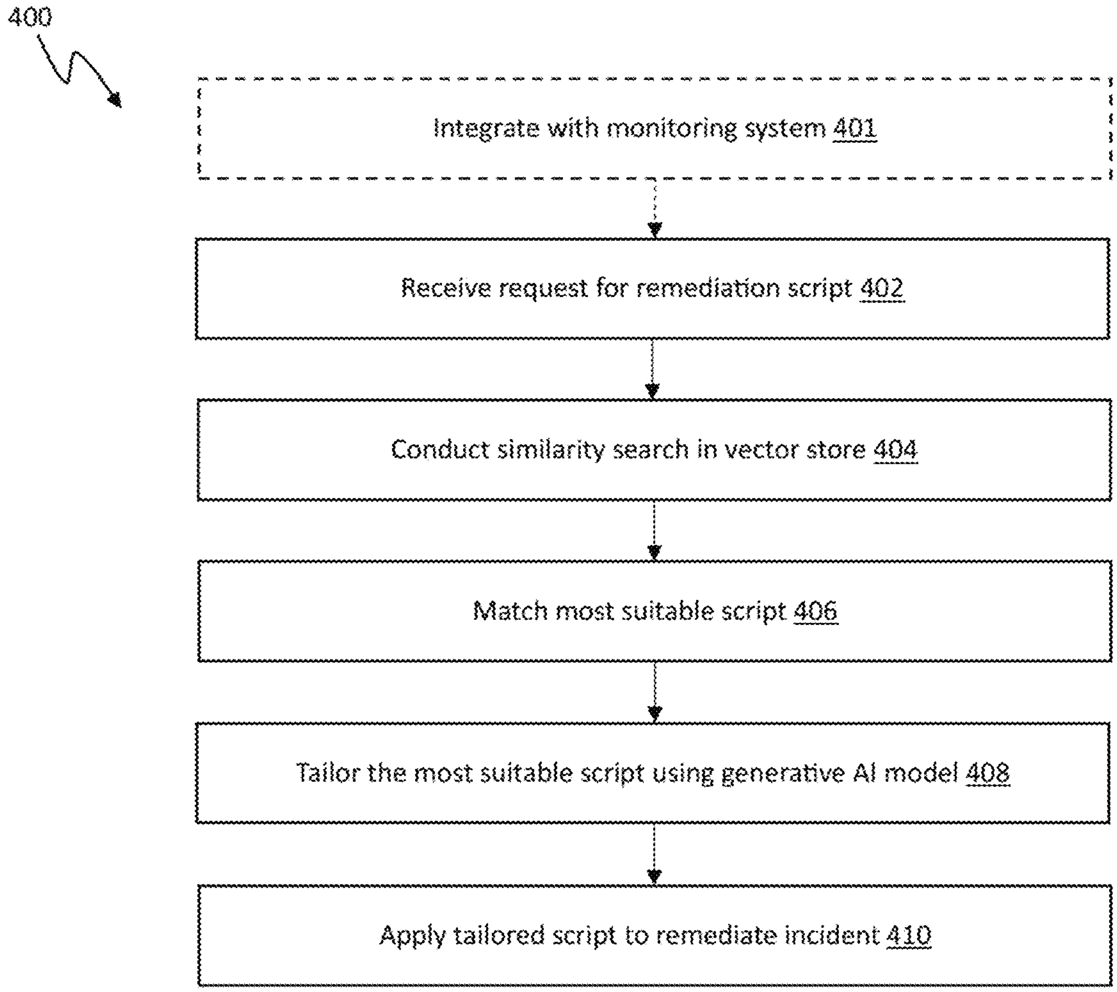
FIG. 4 is a flowchart of a method of remediating an incident on a computer system with a customized remediation script, according to an embodiment.

At 308, method 300 further comprises selectively storing data related to method 300 in a vector store. For example, a response script can be stored in the vector store. In another example, a description generated for the respective script can be stored in the vector store. In another example, the embedding generated for the respective description can be stored in the vector store. In an embodiment, a tuple of associated script, description, and embedding can be stored in the vector store according to a common key, tuple, or other linked data structure. For example, cloud-based AI 104 can store the script, description, and embedding in vector store Referring to FIG. 4, a flowchart of a method 400 of remediating an incident on a computer system with a customized remediation script is depicted, according to an embodiment. In an embodiment, method 400 can be implemented by system 100 and/or 200 as depicted in FIGS. 1-2. Reference will be made to system 100 for ease of discussion.

As illustrated at 401, method 400 optionally comprises integrating one or more components of system 100, 200 into a separate discrete monitoring system. For example, system 100 can be integrated with existing monitoring systems (such as on computing device 102 or operably coupled to computing device 102) to automatically trigger operations 402-410 when an anomaly or incident is detected.

At 402, method 400 further comprises receiving a request for a remediation script. For example, a user can request a remediation script using computing device 102. As part of the request, the user can include incident, environment, user, or other information. Request handler engine 120 receives the request on backend server 110. In an embodiment, a generative AI engine such as embeddings generative AI model can be utilized to create a request vector for the request.

At 404, method 400 further comprises conducting a similarity search in a vector store. For example, matching engine 122 can access vector store 108 (which has been populated by cloud-based AI 104) and conduct a search for the remediation script that will best fit the request. In an embodiment, a cosine similarity search is used to compare the request vector with the vectors of vector store 108.

At 406, method 400 further comprises matching a most suitable script based on the similarity search of 404. For example, matching engine 122 determines a suitable match by a similarity threshold. A similarity less than a similarity threshold is not a suitable match, and a similarity greater than or equal to a similarity threshold is a suitable match.

In another example, matching engine 122 generates a match list where each record has a corresponding similarity score. If the score is less than a threshold, the result is discarded. If there are any results left after threshold filtering matching engine 122 choose a best score result. Otherwise matching engine 122 considers that there are no results.

In another example, matching engine 122 can use other criteria to refine the selection process, including: frequency of use, such that preference is given to scripts that have been successfully used in similar contexts. Here, it is assumed that past success indicates future effectiveness. In another criteria, recent updates can be used such that scripts that have been recently updated or validated can be prioritized.

At 408, method 400 further comprises tailoring the most suitable script using a generative AI model. For example, the script description generative AI model can modify the most suitable script according to one or more parameters.

At 410, method 400 further comprises applying the tailored script to remediate a security incident. For example, remediation engine 124 can provide the tailored script to computing device 102, which can apply the tailored script automatically or by user execution. In another example, remediation engine 124 can itself apply the tailored script to computing device 102 (or an affected system, if not computing device 102).

The invention claimed is:

1. A system for remediating an incident on a computer system, the system comprising:

a script database configured to store a plurality of incident response scripts;

a script description generative artificial intelligence (AI) model configured to generate at least one description for each incident response script of the plurality of incident response scripts as a plurality of descriptions;

an embeddings generative AI model configured to generate a plurality of vectors for each description of the plurality of descriptions;

a vector store configured to store the plurality of incident response scripts, the plurality of descriptions, and the plurality of vectors;

a backend server including at least one processor operably coupled to memory, and instructions that, when executed by the at least one processor, cause the at least one processor to implement:

a request handler engine configured to receive a request for a remediation script and generate a request vector from a script purpose, wherein the request includes a description of the script purpose, and a matching engine configured to perform a similarity search in the vector store based on the request vector and match a most suitable script from the plurality of incident response scripts based on a similarity measure; and a tailoring generative AI model configured to tailor the most suitable script according to the script purpose to generate a tailored remediation script by modifying at least one line in the most suitable script for execution according to the script purpose, wherein the backend server further comprises instructions that, when executed by the at least one processor, cause the at least one processor to implement a remediation engine configured to execute the tailored remediation script to remediate the incident on the computer system, and wherein the script description generative AI model is executed to generate the plurality of descriptions, the embeddings generative AI model is executed to generate the plurality of vectors, and the tailoring generative AI model is executed to generate the tailored remediation script.

2. The system of claim 1, wherein the remediation engine is further configured to monitor success of the execution of the tailored remediation script to remediate the incident on the computer system, and wherein the tailored remediation script is modified in the script database based on the success of the execution of the tailored remediation script to remediate the incident on the computer system.

3. The system of claim 1, wherein the matching engine is further configured to perform the similarity search by a cosine similarity comparison of angles between the plurality of vectors and the request vector.

4. The system of claim 1, wherein the backend server further comprises instructions that, when executed by the at least one processor, cause the at least one processor to implement an integration engine configured to trigger the request when the incident is detected.

5. The system of claim 1, wherein at least one of the script description generative AI model, the embeddings generative AI model, or the tailoring generative AI model is a cloud-based or locally-based large language model (LLM).

6. The system of claim 1, wherein at least one of the script description generative AI model, the embeddings generative AI model, or the tailoring generative AI model is local to the computer system and pre-trained based on a script code base.

7. The system of claim 1, wherein the request handler engine is further configured to determine a pattern associated with historical user requests, and wherein the tailoring generative AI model is further configured to tailor the most suitable script according to the pattern.

8. A method for remediating an incident on a computer system, the method comprising:

storing a plurality of incident response scripts in a script library;

executing a script description generative artificial intelligence (AI) model to generate at least one description for each incident response script of the plurality of incident response scripts as a plurality of descriptions;

executing an embeddings generative AI model to generate a plurality of vectors for each description of the plurality of descriptions;

storing the plurality of incident response scripts, the plurality of descriptions, and the plurality of vectors in a vector store;

receiving a request for a remediation script, wherein the request includes a description of a script purpose;

generating a request vector from the script purpose;

performing a similarity search in the vector store based on the request vector and matching a most suitable script from the plurality of incident response scripts based on a similarity measure;

executing a tailoring generative AI model to tailor the most suitable script according to the script purpose to generate a tailored remediation script by modifying at least one line in the most suitable script for execution according to the script purpose; and executing the tailored remediation script to remediate the incident on the computer system.

9. The method of claim 8, further comprising:

monitoring success of the execution of the tailored remediation script to remediate the incident on the computer system; and modifying the tailored remediation script in the script library based on the success of the execution of the tailored remediation script to remediate the incident on the computer system.

10. The method of claim 8, wherein performing the similarity search includes a cosine similarity comparison of angles between the plurality of vectors and the request vector.

11. The method of claim 8, further comprising triggering the request when the incident is detected.

12. The method of claim 8, wherein at least one of the script description generative AI model, the embeddings generative AI model, or the tailoring generative AI model is a cloud-based or locally-based large language model (LLM).

13. The method of claim 8, wherein the request further includes an environmental parameter, the method further comprising executing the tailoring generative AI model to tailor the most suitable script according to the environmental parameter by modifying at least one line in the most suitable script for execution according to the environmental parameter.

14. The method of claim 8, wherein at least one of the script description generative AI model, the embeddings generative AI model, or the tailoring generative AI model is local to the computer system and pre-trained based on a script code base.

15. The method of claim 8, further comprising:

determining a pattern associated with historical user requests; and tailoring the most suitable script according to the pattern.

16. A system for remediating an incident on a computer system, the system comprising:

a plurality of cloud-based generative artificial intelligence (AI) models trained on a library of remediation scripts, wherein the plurality of cloud-based generative AI models include:

a first model configured to generate a plurality of descriptions including a description for each remediation script in the library of remediation scripts, a second model configured to generate a plurality of embeddings for the plurality of descriptions including an embedding representation of each description of the plurality of descriptions, and a third model configured to modify a remediation script of the plurality of remediation scripts based on a script request;

a vector store configured to store the plurality of remediation scripts, the plurality of descriptions, and the plurality of embeddings; and a backend server including a processor and an operable coupled memory and configured to:

execute the first model to generate the plurality of descriptions, perform a similarity search in the vector store based on the script request and match a most suitable script using a cosine similarity comparison of angles between the plurality of embeddings and a request embedding of the script request, execute the second model to generate the request embedding of the script request, execute the third model to modify the most suitable script to generate a tailored remediation script by modifying at least one line in the most suitable script for execution according to the script request, and provide the tailored remediation script to the computer system for remediation of the incident, wherein the tailored remediation script is executed to remediate the incident on the computer system.

17. The system of claim 16, wherein the backend server is further configured to trigger the script request when the incident is detected.

18. The system of claim 16, wherein the third model is executed to modify the most suitable script according to an incident type and a computer system parameter.

19. The system of claim 16, wherein the backend server is further configured to store the tailored remediation script in a temporary buffer while the tailored remediation script is validated.

20. The system of claim 19, wherein the backend server is further configured to add the tailored remediation script to the library of remediation scripts after being validated.

* * * * *